March 22, 1927.

R. D. VALENTINE

POLE PUNCTURING MACHINE

Filed June 4, 1923      6 Sheets-Sheet 3

1,621,963

INVENTOR
ROBERT D. VALENTINE
By Paul, Paul & Moore
ATTORNEYS

INVENTOR
ROBERT D. VALENTINE

March 22, 1927.  
R. D. VALENTINE  
POLE PUNCTURING MACHINE  
Filed June 4, 1923   6 Sheets-Sheet 5
1,621,963
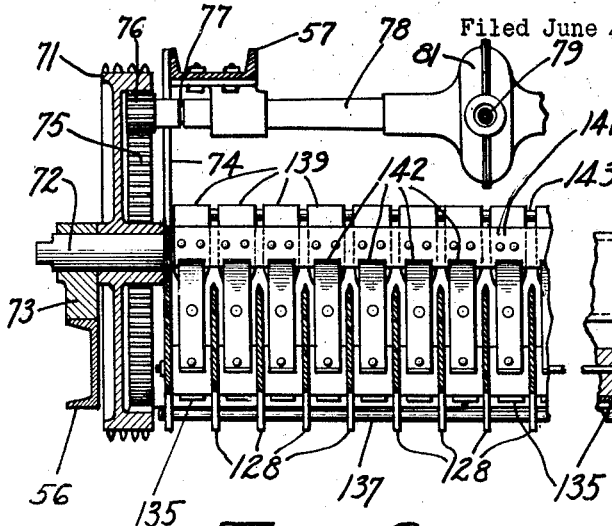
FIG. 6
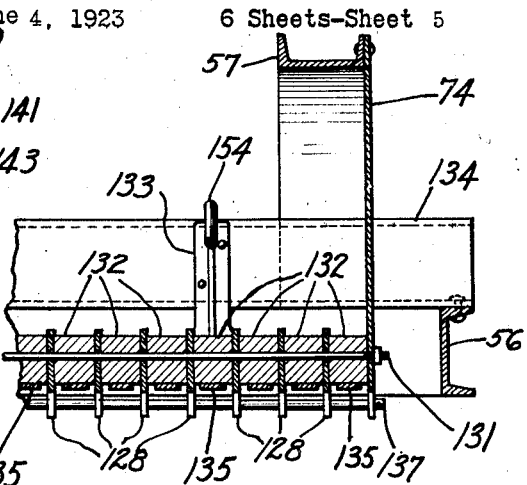
FIG. 7
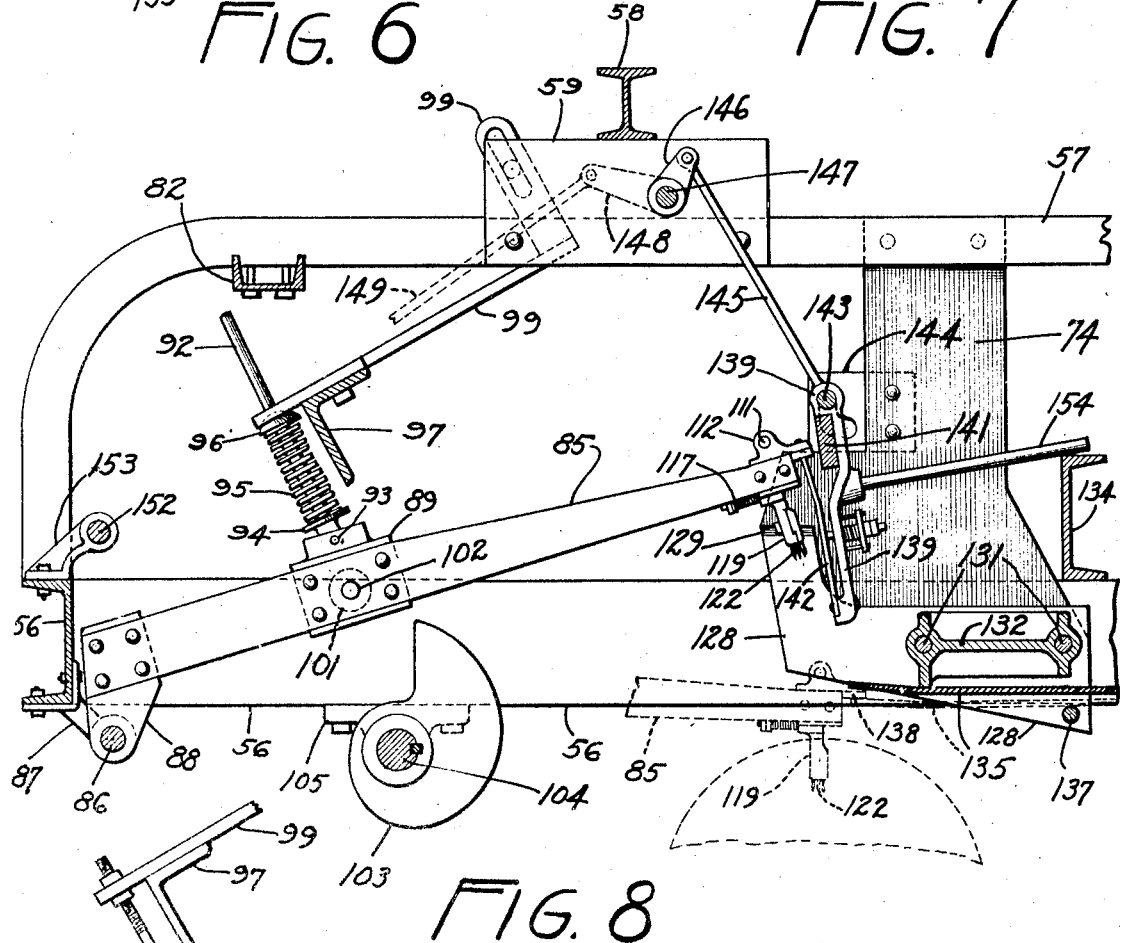
FIG. 8
FIG. 9
INVENTOR  
ROBERT D. VALENTINE  
By Paul, Paul & Moore  
ATTORNEYS March 22, 1927.
R. D. VALENTINE
1,621,963
POLE PUNCTURING MACHINE
Filed June 4, 1923   6 Sheets-Sheet 6
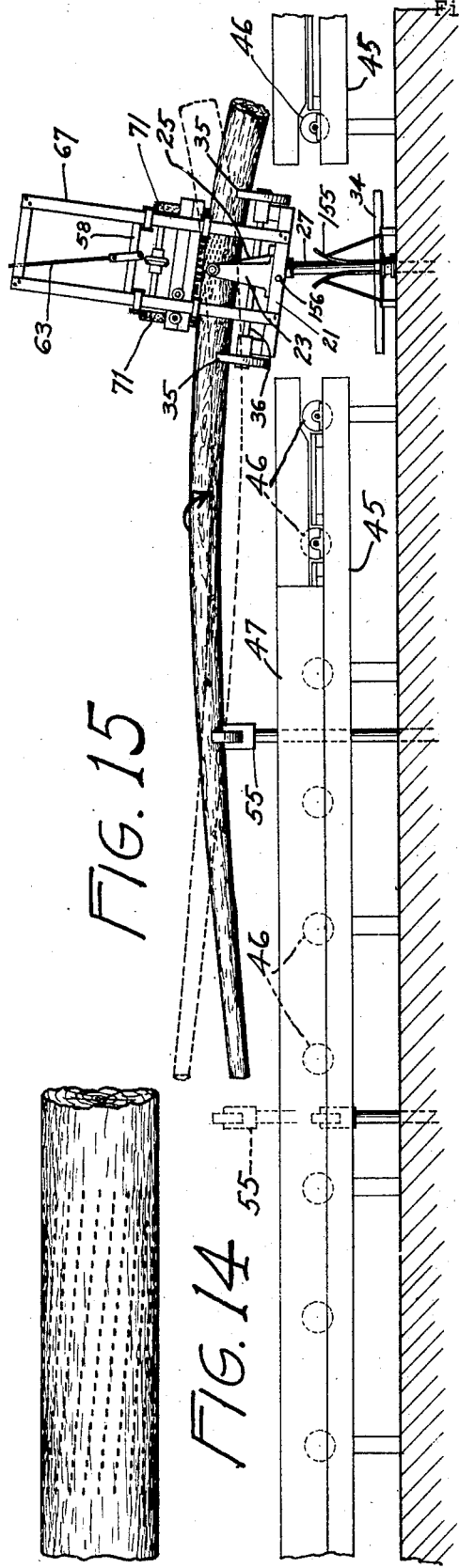
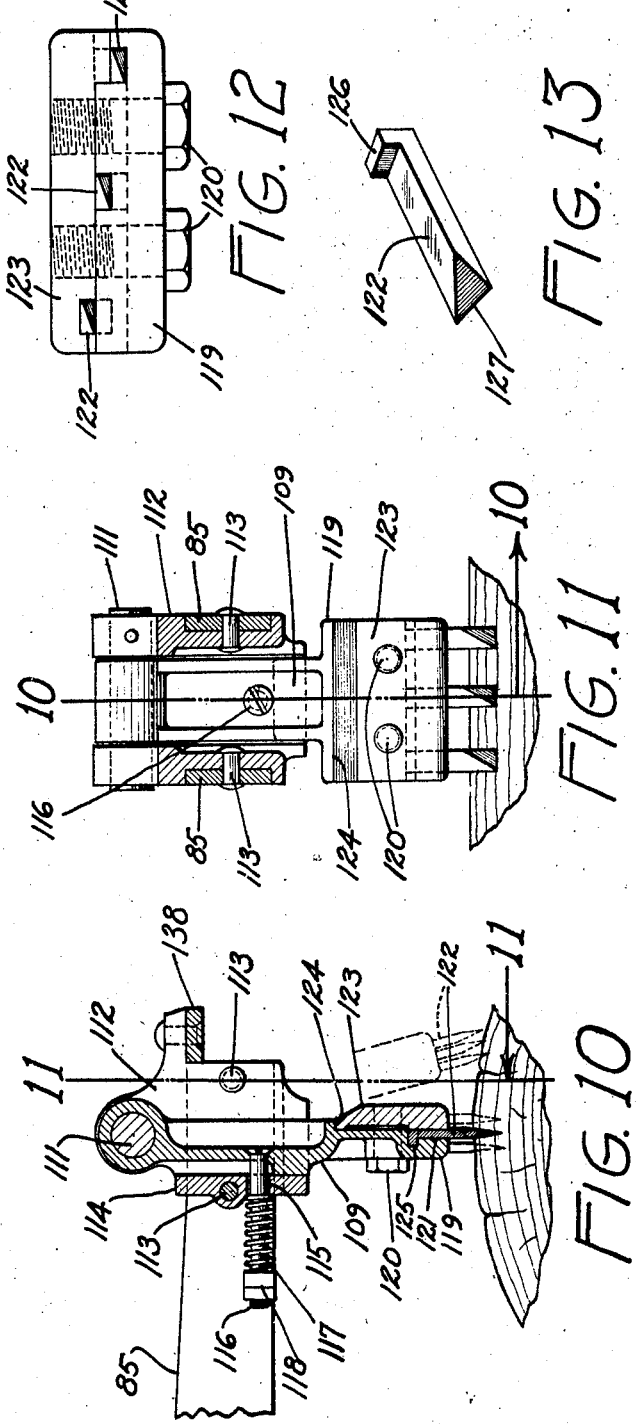
INVENTOR
ROBERT D. VALENTINE
BY
ATTORNEYS Patented Mar. 22, 1927.

1,621,963

UNITED STATES PATENT OFFICE.

ROBERT D. VALENTINE, OF MINNEAPOLIS, MINNESOTA, ASSIGNOR, BY MESNE ASSIGNMENTS, TO NATIONAL POLE & TREATING COMPANY, OF MINNEAPOLIS, MINNESOTA, A CORPORATION OF DELAWARE.

POLE-PUNCTURING MACHINE.

Application filed June 4, 1923. Serial No. 643,256.

This invention relates to improvements in pole puncturing machines such as are commonly used to puncture or pierce the surface of a log or pole to prepare it for subsequent treatment with a suitable preservative fluid, such as oil or creosote, the holes permitting the preservative to penetrate to the required depth into the wood.

The primary object of the invention is to provide a pole puncturing machine having improved means for facilitating the operation of puncturing to reduce to a minimum the time and labor required, and to properly handle the log or pole in preparing it to receive the preservative fluid.

A further and particular object of the invention is to provide a machine having an improved puncturing mechanism by the use of which the periphery of the pole will be evenly and uniformly pierced or punctured regardless of its shape.

A further object is to provide a pole puncturing machine so designed and constructed as to automatically adapt itself to any irregularity or curvature of a pole, and one which is capable of puncturing practically all sizes of poles.

A further object is to provide a machine of the class described having an improved knife supporting and operating means adapted to puncture the surface of the pole while the pole is being rotated.

A further object is to provide a machine having means for bodily lifting the pole from the conveyor while it is being punctured.

A further object is to provide a machine of simple and inexpensive construction which will be efficient and positive in its performance.

Other objects will more fully appear from the folowing description and the accompanying drawings and will be pointed out in the annexed claims.

In the drawings, there has been disclosed a structure designed to carry out the various objects of the invention, but it is to be understood that the invention is not confined to the exact features shown, as various changes may be made within the scope of the claims which follow.

In the drawings:

Figure 6 is a detail sectional view on the line 6—6 of Figure 5, showing the means provided for retaining the knife blocks and knives in inoperative position and also showing the separators provided between the knife holders;

Figure 7 is a detail sectional view on the line 7—7 of Figure 5 showing the means provided for securing the knife separators to the frame of the pole puncturing head;

Figure 8 is an enlarged detail sectional view showing the knife supporting arms in inoperative position;

Figure 9 is a fragmentary detail view showing the means provided for supporting the knife pressure bar;

Figure 10 is an enlarged detail sectional view on the line 10—10 of Figure 11, showing the means provided for pivotally and yieldingly supporting the knife holders upon the knife arms;

Figure 11 is a vertical sectional views on the line 11—11 of Figure 10, showing the preferred manner of mounting the knives in the knife holders;

Figure 12 is a bottom view of the knife holder showing the relative position of the knives when mounted therein;

Figure 13 is a perspective view of one of the pole puncturing knives removed from the knife holder;

Figure 14 is a detail view of a portion of a pole, after the outer surface thereof has been punctured; and Figure 15 is a diagrammatic view, showing how the machine will adapt itself to the curvature of a pole during the pole puncturing operation and also showing the means provided for supporting the smaller end of the pole during such operation.

Figure 2:
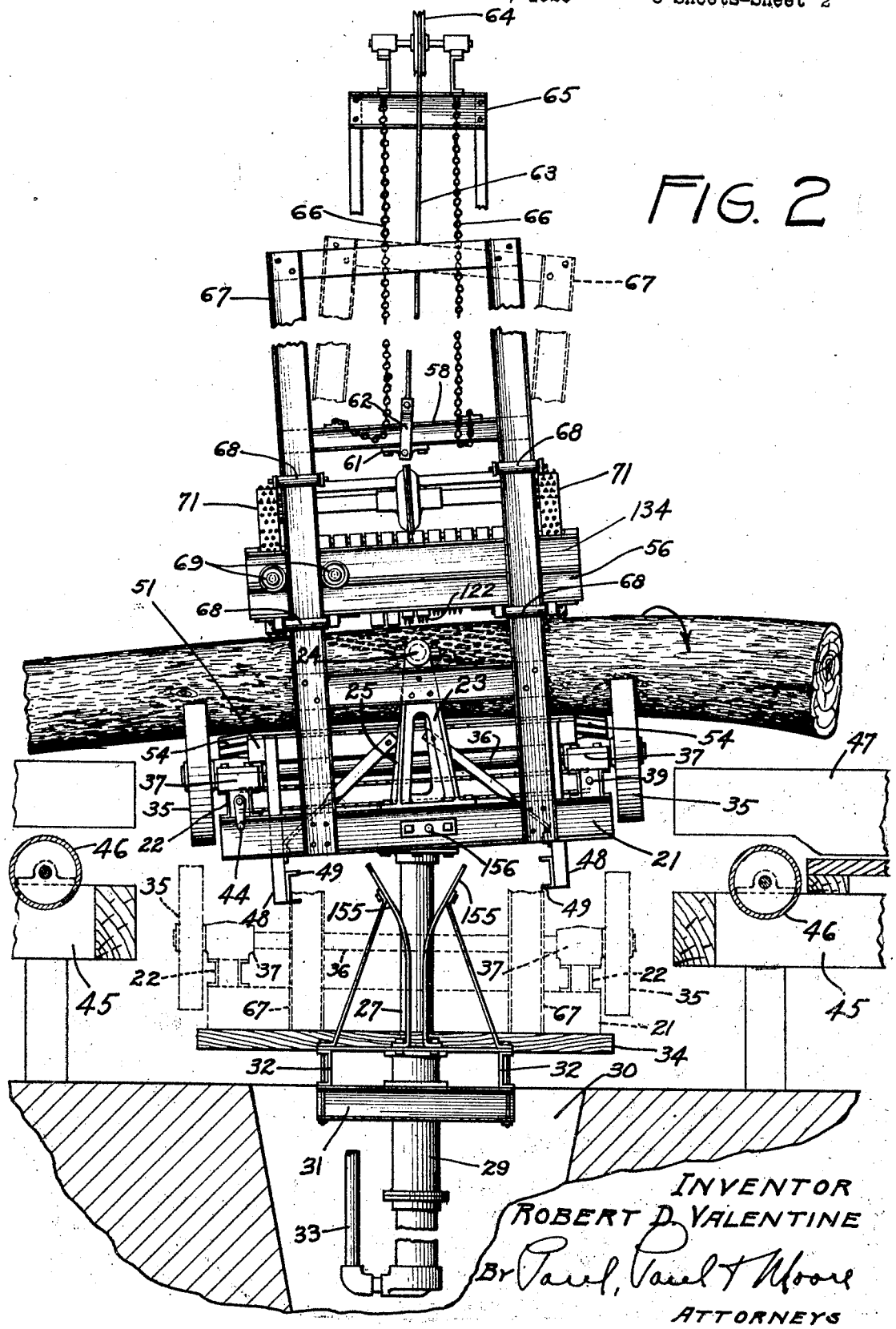
Figure 2 is a view in front elevation, showing a pole positioned in the machine during the process of puncturing the surface thereof.
Figure 3:
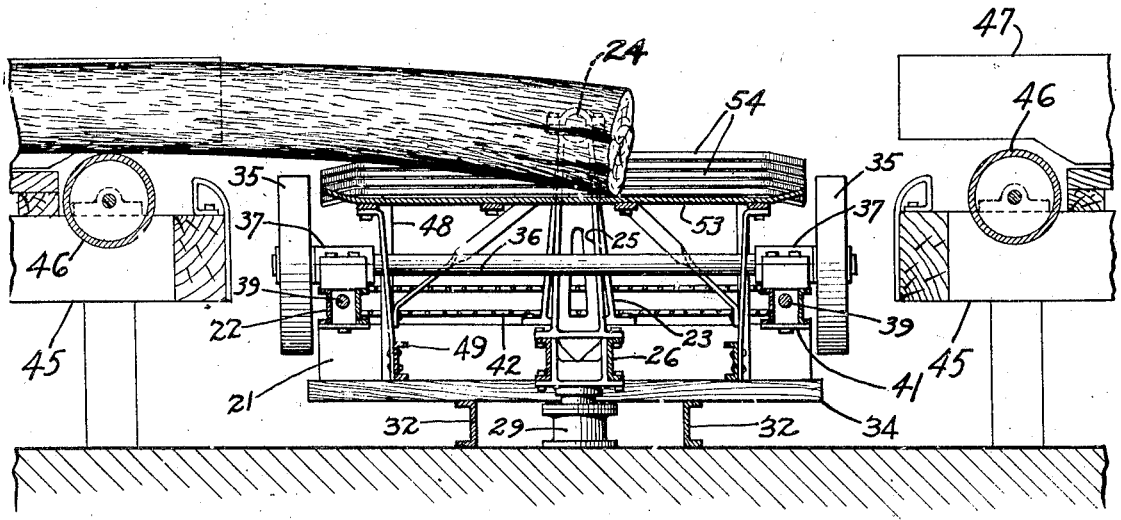
Figure 3 is a vertical sectional view on the line 3—3 of Figure 1, showing the movable guide table for guiding the end of the pole across the pole-lifting carriage and onto the conveyor at the opposite end thereof.
Figure 4:
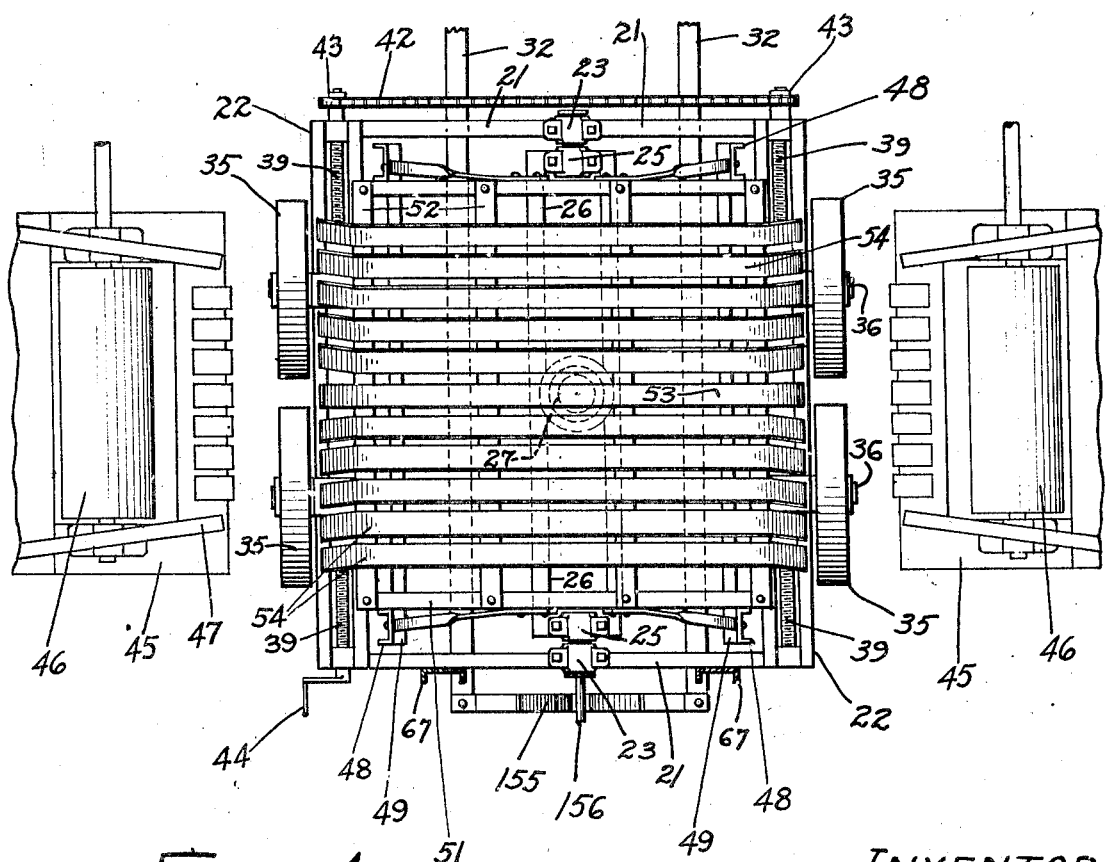
Figure 4 is a horizontal view on the line 4—4 of Figure 1, showing the relative position of the pole lifting carriage and the two conveyors for conveying the poles to and from the machine.

In the selected embodiment of the invention here shown there is illustrated a pole puncturing machine, comprising in general, a pole-lifting carriage and a pole-puncturing head or frame. The frame of the pole-lifting carriage consists preferably of a pair of opposed beams 21 having their ends secured together preferably by means of the dual tie bars or channel irons 22 provided at each end thereof, thus forming a rectangular frame (Figures 2, 3 and 4). A pair of upright brackets 23 are secured to the beams 21. The upper ends of these brackets are suitably bored to provide bearings for the pivot pins 24, having their other ends preferably fixedly mounted in similar upright brackets 25 which are mounted upon a suitably constructed cross-head 26.

Hydraulic means are preferably employed for raising and lowering the pole-lifting carriage. Referring to Figures 1, 2, 3 and 5, it will be noted that the cross-head 26 is securely mounted upon the upper terminal end of a ram 27 by means of the bracket or ram-head 28. The lower end of the ram is received within a cylinder 29 of usual construction, which, as here shown, depends into a pit 30 provided beneath the machine. The cylinder is preferably supported by means of the channel bars 31 which in turn are borne by two parallel frame members 32. The usual pipe connection 33, leading to the fluid control valve, (not here shown), is provided at the bottom of the cylinder. Stop bars 34 are preferably secured to the upper face of the frame members 32 upon which the pole-lifting carriage may rest when in normal position, Figures 1 and 3.

Figure 5:
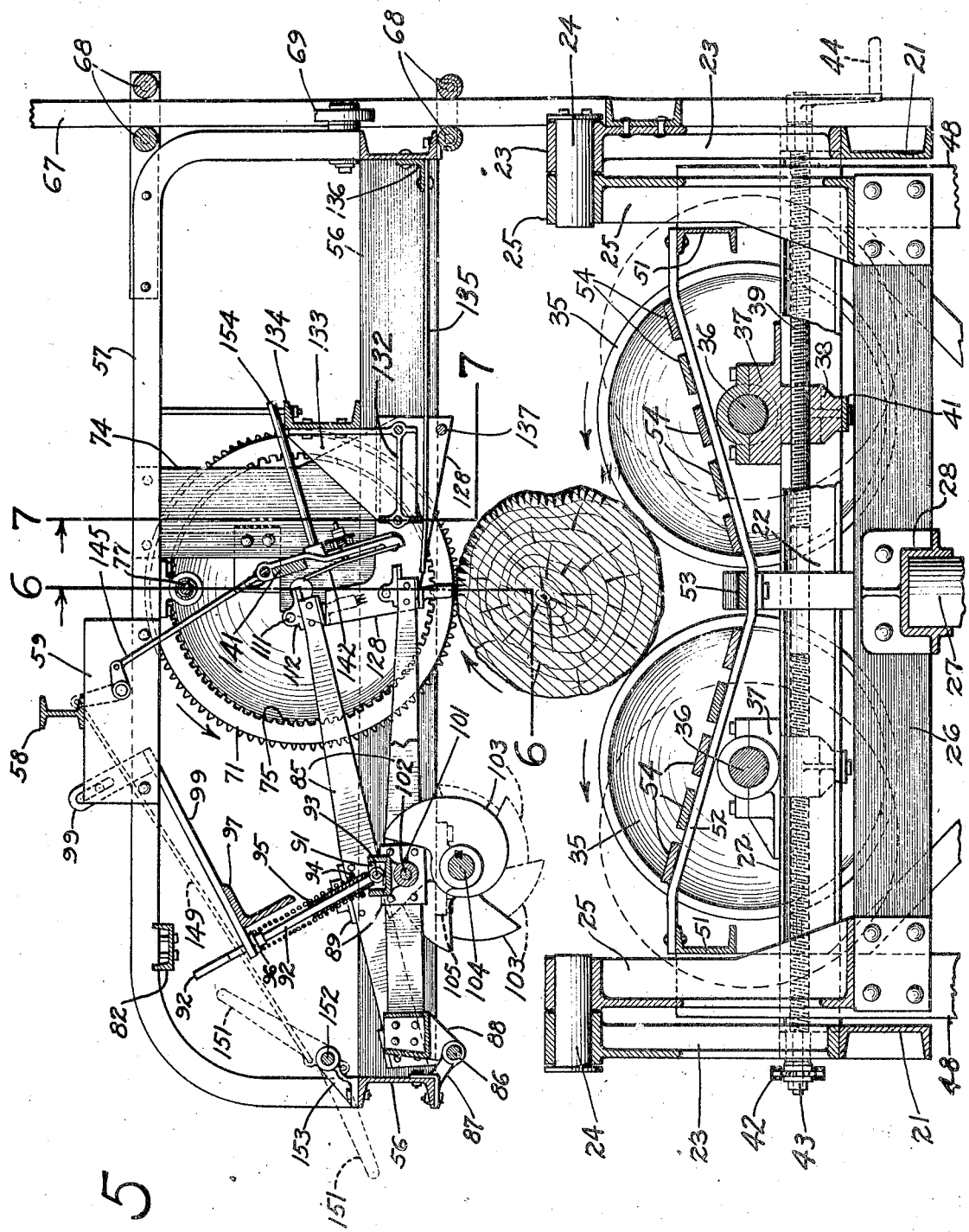
Figure 5 is an enlarged vertical sectional view of the pole-lifting carriage and the movably mounted pole puncturing frame, showing a pole positioned therebetween and also showing the pole puncturing mechanism.

The means provided for supporting the log upon the pole-lifting carriage consists preferably of four rotatably mounted rolls or wheels 35 which are borne by a pair of adjustably mounted shafts 36. These wheels are preferably loosely mounted upon the shafts, or each shaft may have one wheel secured thereto while the other is loosely mounted thereon, thus permitting each roll to rotate independently of the other for the purpose of eliminating any frictional contact between the pole and wheels, should the diameter of the pole be irregular and uneven. As shown in Figure 5, it will be noted that the shafts 36, carrying the rolls 35, are adjustable to and from each other thus adapting the machine for poles of different diameters. The shafts 36 are preferably mounted in split bearings 37 which are slidably mounted upon the dual channel bars 22 of the pole-lifting carriage. The bearings 37 are preferably provided with an integral downwardly extending end portion 38 adapted to receive a threaded shaft 39 in threaded engagement therein, as shown in Figure 5. Each bearing 37 has a plate 41 secured to the bottom face of its end portion 38 adapted to engage the lower face of the channels 22 for the purpose of retaining it in place upon said channels. Referring to Figure 5, it will also be noted that one end of each shaft 39 is provided with a right hand thread while the opposite end of each shaft is provided with a left hand thread. The two shafts are connected together by means of a suitable chain 42 and sprockets 43 secured to the terminal end of each shaft. A crank 44 is also provided upon the end of one of the shafts preferably at the front side of the carriage, by means of which the shafts may be rotated. Thus, when it is desired to change the relative position of the rolls 35 for the purpose of adapting the machine to poles of a different size, the crank 44 will be rotated either one way or the other as required, causing the rolls to move to or from each other until properly adjusted for the average run of poles to be punctured. This adjustment for poles of different sizes, however, is not essential as poles of various diameters may be punctured with each setting of the rolls.

Referring now to Figures 2, 3, 4 and 15, it will be noted that the pole puncturing machine is preferably positioned between two conveyors. These conveyors are of ordinary construction comprising a frame 45 upon which there is mounted a plurality of power driven rollers 46. Suitable guides 47 are also provided upon each side of the conveyors to guide the logs or poles along the conveyor to the puncturing machine.

Figure 1:
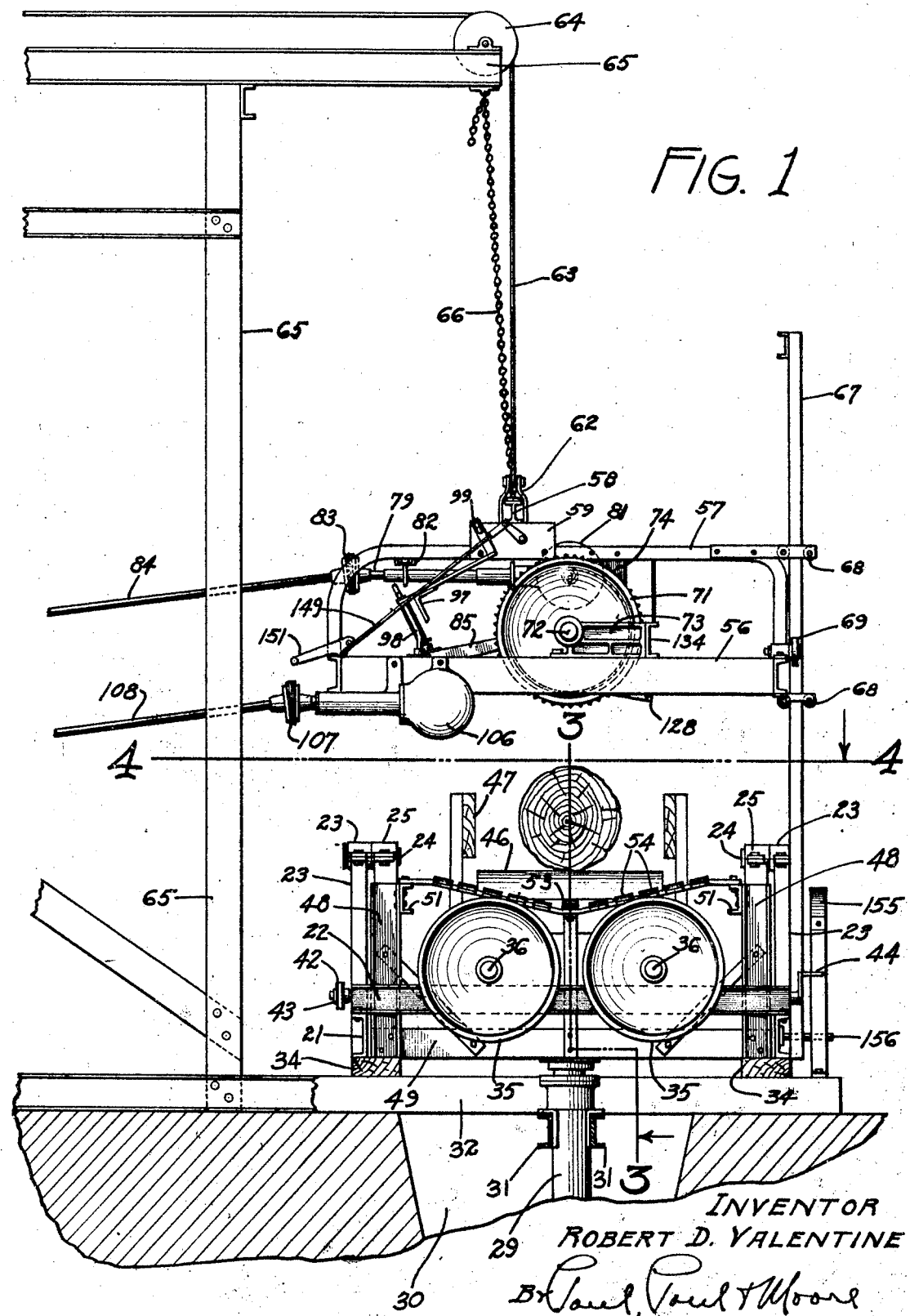
Figure 1 is a view in end elevation of a pole puncturing machine, showing the apparatus positioned to receive a pole.

An important feature of this invention resides in the novel means provided for guiding the end of the pole across the pole-lifting carriage when the log is being positioned in the machine for puncturing. The ends of the poles are often found to be curved and sometimes very crooked, and it is therefore very difficult to pass the end of such a pole over the carriage. Means are therefore provided by the use of which the end of any pole, regardless of its shape, may be properly guided across the pole-lifting carriage. As shown in the drawings, particularly in Figures 1, 3, 4 and 5, such means consists in providing a pole-end guide table which is movably mounted upon the pole-lifting carriage and adapted to guide the end of the pole across the carriage, as clearly shown in Figure 3. The frame of this guide table is preferably constructed of structural steel, comprising four upright posts 48 which are connected together in pairs at the bottom by suitable channel bars 49, each such pair of posts being connected together at the top by similar bars 51, arranged at right angles with reference to the bars 49. Metal bars 52 are interposed between the bars 51 to provide a means for supporting the top of the table. Referring to Figures 1 and 5, it will be noted that the bars 52 are inclined towards the center where they are connected together by a center strip or bar 53 which preferably has each end upturned, as indicated in Figure 3. Upon each side of the center strip 53, there is mounted in spaced relation, a plurality of similar strips 54 which are similarly secured to the bars 52 and preferably have their terminal ends bent downwardly, as also indicated in Figure 3. When the guide table has thus been assembled, the top thereof will present two inclined surfaces, as clearly shown in Figures 1 and 5, thereby causing the pole to be guided towards the center of the table, and over the center of the pole-lifting carriage in passing thereover.

In Figures 1 and 3, the pole-lifting carriage is shown in normal or pole-receiving position, the beams 21 of the carriage resting upon the stop bars 34. When the carriage is positioned as above it will be noted that the pole-end guide table is also resting upon the stop bars 34 and that the top surface of the strips 54 will be substantially above the rolls 35, thus preventing the pole from coming in contact therewith, the table carrying the weight of the end of the pole until it reaches the conveyor at the opposite side of the carriage. When the end of the pole is thus being guided across the guide table and reaches the upturned end of the center strip 53, it will be elevated sufficiently to enter the conveyor at that side of the carriage without interference with the carriage or with the end of the conveyor. The downwardly bent ends of the bars 54 will prevent the pole from contacting with the end of the table and thus prevent the pole from being retarded in its forward movement. As soon as the pole has passed over the carriage a suitable distance or sufficiently to bring that portion of the pole which is to be punctured in alinement with the carriage, the forward movement of the pole will be arrested. The carriage will then be elevated by means of the hydraulic hoist, hereinbefore described, until the rolls 35 engage the pole and carry it upwardly therewith. During this initial movement of the carriage the guide table will remain stationary for a predetermined length of time to allow it to assume the position shown in Figures 2 and 5, when it will be out of engagement with the pole. When it has assumed the above position it will be carried upwardly by the carriage, the bearings 37 engaging the bars 52 of the table. During the elevating of the butt end of the pole by the carriage the top or small end thereof will simultaneously be elevated by means of an auxiliary hoist 55, operable in conjunction with the main hoist.

The novel mechanism provided for rotating and puncturing the log or pole is carried by a structural steel frame preferably suspended by flexible means directly above the pole-lifting carriage, and vertically guided by means of an upright frame secured to the carriage frame. The structural steel frame above referred to consists of a rectangular horizontal frame 56 having a pair of upper frame members 57 secured to each end thereof and in spaced relation thereto (Figures 1 and 5). The upper portion of this frame is provided with a cross beam 58 suitably secured to the upper frame member 57 by means of the plates 59. A bracket 61 is preferably secured to the lower face of the cross beam 58. This bracket has a yoke 62 connected thereto which in turn is connected to the depending end of a suitable cable 63 which passes over a sheave 64 mounted upon the upper portion of a frame 65. The other end of this cable (not shown) is provided with a suitable weight to counteract a portion of the weight of the pole-puncturing frame or head. Adjustable stops 66, preferably of chain, are provided to limit the downward movement of the pole-puncturing head, as shown in Figures 1 and 2.

The means provided for vertically guiding the head with reference to the pole-lifting carriage consists of an upright guide frame 67 which is secured to the carriage frame as shown in Figures 1, 2 and 5. Suitable guide rollers 68 are provided upon each side of the puncturing head frame, adapted to receive the upright posts of the guide frame 67 therebetween, as particularly shown in Figure 5. Anti-friction rollers 69 are also provided upon the frame 56 adapted to similarly engage the sides of one of the posts of the guide frame 67, shown in Figures 1, 2, and 5.

Means are also provided for rotating the pole when positioned between the pole-lifting carriage and the puncturing head, as shown in Figure 5. Such means consist of a pair of drive rollers 71 which are rotatably mounted upon suitable studs 72 borne by brackets 73 and the plates 74 having their upper ends secured to the upper frame members 57 (see Figures 5, 6, 7 and 8).

The inner terminal ends of the studs are preferably received in threaded engagement with the plates 74, as shown in Figure 6, thereby providing a very substantial support. The periphery of each drive wheel 71 is provided with a plurality of removably mounted teeth adapted to engage the surface of the log or pole and thus transmit a rotary motion thereto without slippage between the wheels and pole. The teeth or pins are preferably adjustable to adapt them for the wood of different poles, it being desirable in some poles to have the teeth penetrate a greater distance than in others. The drive wheels 71 are preferably provided with integrally formed internal gears 75, adapted to be engaged by pinions 76 terminally provided upon a suitable drive shaft 77, here shown as being contained in a suitable housing 78, of ordinary construction, and operable by means of a drive shaft 79 through an ordinary differential 81. The rearwardly extending end of the drive shaft 79 is preferably supported by means of a cross member 82, secured to the upper frame members 57 of the puncturing head frame. A universal joint 83 is mounted upon the terminal end of the shaft 79 to which a shaft 84 is connected. The shaft 84 may be connected to any suitable source of power desired. A clutch, not shown, is preferably located in the power shaft within control of the operator of the machine.

The means provided for operating the puncturing knives consists of a plurality of individually operated knife supporting arms 85 which are pivotally mounted upon a shaft 86 borne by a plurality of suitable brackets 87, secured to the frame 56, as shown in Figures 5 and 8. Each one of these arms is preferably constructed of two flat steel bars which are held in spaced relation by means of the pivot bracket 88 and a cam roller block 89, interposed between the two bars and securely riveted thereto, as shown. The cam roller block 89 is provided with a socket 91 which has a spring guide rod 92 connected thereto by means of a pivot pin 93. A flanged sleeve 94 is provided upon the lower end of the rod 92 adapted to support the lower end of a compression spring 95. The upper end of the spring is seated against a suitable washer 96 which is supported by means of an adjustably mounted pressure bar 97, secured to the frame 56 by means of the rods 98 (Figure 9) and also to the plates 59, provided upon the upper frame members 57, by means of the slotted arms 99.

The cam roller block 89 is provided with an opening beneath the socket 91 in which a cam roller 101 is rotatably mounted upon a pin 102. This roller is yieldingly held against the surface of a cam 103 which is keyed to a shaft 104, rotatably mounted in bearings 105 secured to the bottom face of the puncturing head frame 56. A gear drive is provided at one end of the cam shaft 104, by means of which the shaft may be operated. This drive is of ordinary construction and is therefore not shown in detail in the drawings, same being contained within a suitable housing 106, as shown in Figure 1. A universal joint 107, similar to the one shown on the feed roll drive shaft, is provided and is connected to one end of a drive shaft 108, which in like manner may be connected to any suitable source of power.

Another important feature of this invention is the novel means provided for supporting the pole-puncturing knives or blades, such means being mounted in such a manner as to provide a mechanism capable of puncturing or piercing the periphery of a pole or log while such pole is being rotated.

Each knife-supporting arm 85 is provided with a knife holder 109 which is pivotally mounted upon a pivot pin 111 secured to a knife-holder block 112, which is terminally mounted between the two steel bars of the knife-supporting arm 85 and secured thereto by suitable rivets 113, as shown in Figures 10 and 11. The two sides of the knife-holder block 112 are preferably tied together by an integral wall 114. This wall is provided with an aperture 115 to receive a headed pin 116 which is loosely mounted in the knife holder 109. A compression spring 117 is coiled about the pin and retained thereon by means of the threaded nuts 118, thus normally and yieldingly holding the knife holder against the wall 114 of the knife-holder block 112, substantially at right angles to the longitudinal centerline of the knife supporting arm 85, as shown in Figure 10. Thus the knife holder will be yieldingly held in normal or operative position and at the same time will be free to change its position with reference to the arm 85, as indicated by the dotted lines in Figure 10, caused by the constant rotation of the pole during the puncturing operation. The lower enlarged portion 119 of the knife holder 109 is provided with a seat 121 against which the knife blades 122 are securely clamped by means of a cap 123 which is preferably seated against a shoulder 124 and secured to the lower portion 119 of the knife holder by means of bolts 120. A groove 125 is preferably provided in the seat 121 adapted to receive a tongue 126 provided at the upper end of the knife blade and preferably integrally formed therewith, as shown in Figure 13. The lower portion 119 of the knife-holder block and also the cap 123 are preferably notched, as shown in Figure 12, thus providing a means whereby the knife blades may be rigidly and securely clamped in the holder and at the same time may be quickly and readily removed for renewal or for substituting a shorter or longer knife. A plurality of knife blades are preferably mounted in each head, as shown in the drawings, but it is to be understood that the invention is not confined to the exact number shown, as one or more may be used as desired. The knife blades are also preferably provided with a relatively diagonal cutting edge 127, and are arranged in staggered relation as shown in Figures 12 and 13. The purpose of staggering the knife blades is primarily to sever the wood fibers transversely and present broader areas or surfaces thereof to the action of the preservative fluid; this fluid having a tendency to follow the grain of the wood between the puncture points, and obviously it is an advantage to have a considerable transverse area of the fiber exposed. When the blades are thus staggered, the indentation or piercings in the surface of the pole after the pole has gone through the puncturing process, will present an angular or spiral effect, as shown in Figure 15.

Means are also provided to positively prevent the knife holders from contacting with each other during the operation of the machine, should they become loose in their bearings due to wear, etc. In order to avoid any such interference suitable separators 128 are provided between the ends of the knife supporting arms or the knife holders 109, thus eliminating any danger of interference between the knife holders. The upper edge 129 of each separator is also preferably sharpened to prevent the knife holders from becoming locked thereon. These separators, preferably of sheet metal, are mounted upon suitable tie rods 131 which are secured to the end plates 74 as shown in Figures 6 and 7. Spacing blocks 132 are provided between the separators to keep them in alinement with the knife holders. Two of the spacing blocks 132 are preferably provided with upwardly extending lugs 133 which are secured to a cross beam 134. This cross beam is suitably secured to the pole-puncturing frame 56, as particularly shown in Figure 7. In this figure it will also be seen that the spacing blocks having the lugs 133 are preferably mounted adjacent each end of the group of separators thus cooperating with the end plates 74 to provide a very substantial means for supporting the separators upon the pole puncturing frame.

It is also desirable that means be provided to prevent the cam rollers 101 from striking the low sides of the cams 103 with a jar when they drop off the high sides of the cams, should the pole or log be removed from the machine while in operation. Such means consist of providing a plurality of spring buffer bars 135 which are secured to the frame 56 preferably by means of an angle bar 136. These buffer bars are arranged in alinement with the knife supporting bars, their active ends being supported by means of a rod 137, suitably held by means of the depending end portions of the separators 128 and the end plates 74. Normally the active ends of these buffer bars will be held against the lower portions of the spacing blocks 132 by the spring tension in the bars, as shown in Figure 5. Stop plates 138 are provided upon the knife-holder blocks adapted to engage the ends of the buffer bars 135, when the arms 85 drop to the dotted line position, shown in Figure 8, thus preventing the cam rollers from striking the low sides of the cams with a jolt, and jarring the machine.

Means are also provided for lifting the knife supporting arms 85 out of engagement with the cams 103 and retaining them in such inoperative position. A plurality of lifting brackets 139 are secured to a suitable lifting bar 141 in alinement with the knife supporting arms 85. Each bracket 139 is provided with a yieldingly mounted latch member 142 adapted to engage its corresponding stop plate 138 provided upon the knife-holder blocks 112 when positioned, as shown in Figure 8. The upper portion of each bracket 139 is apertured to receive a rod 143 which has its terminal ends projecting through slotted guide plates 144, secured to each end plate 74, as shown in Figures 5 and 8. Lifting rods 145 are connected to each end of the rod 143 and have their upper ends pivotally connected to arms 146 mounted upon a rock shaft 147 which is mounted in the plates 59 provided upon the upper frame members 57. An arm 148 is secured to one end of the rock shaft 147 and is connected by means of a rod 149, to a suitable hand lever 151 which is pivotally mounted upon a shaft or rod 152 mounted in brackets 153, as shown in full lines, Figure 1 and dotted lines, Figure 5. The brackets 153 are preferably secured to the frame 56. Two of the lifting brackets 139 are preferably provided with outwardly extending pins 154 adapted to bear upon the upper face of the cross beam 134, as shown in Figures 5 and 8, to properly position the brackets and latch members 142 when being moved in and out of engagement with the stop plates 138 provided at the terminal ends of the knife supporting arms.

When the hand lever 151 is in the upper dotted line position, shown in Figure 5, the latch members 142 will be out of engagement with the stop plates 138, and the knife supporting arms will be in operative position, the cam rollers 101 provided thereon being in contact with the operating cams 103. When it is desired to lift the arms out of engagement with the cams, the hand lever 151 will be moved from the upper to the lower dotted line position, shown in Figure 5, and the full line position, shown in Figure 1, in which position the latch members 142 will assume the position shown in Figure 8, in engagement with the stop plates 138, thereby retaining the arms in inoperative position or out of engagement with the operating cams 103.

A carriage centering device is preferably provided for centering the pole-lifting carriage when it is returned to normal or pole-receiving position, Figures 1 and 3. This device consists of two opposed upright guide members 155 which are suitably secured to the forwardly extending ends of the frame member 32. The upper ends of these guides are preferably outwardly flared, as shown in Figure 2, to receive therebetween a centering pin 156 which is secured to the forward side of the carriage frame. Thus, when the carriage is lowered the pin 156 will engage the upright guide members 155 thereby centering the carriage before it reaches the limit of its downward movement.

Operation.

The operation of this machine may be explained in the following manner: The machine is first positioned as shown in Figure 1, i. e., with the pole-lifting carriage resting upon the stop bars 34 in position to receive the end of the pole, and with the pole-puncturing head suspended over the carriage by means of the stop chains 66 and the cable 63. The poles may be delivered to the puncturing machine from either side as convenient, by any suitable means, such, for example, as the power operated conveyors shown in the drawings. As the poles are thus delivered to the machine, the end of a pole, if crooked, may engage the metal strips 53 and 54 of the pole-end guide table, as shown in Figure 3, the table guiding the end of the pole across the carriage and onto the conveyor at the opposite side of the machine. Should the pole be substantially straight the end thereof may pass over the guide table and carriage without interference therewith, until the carriage is elevated.

When the pole has traveled the desired distance or sufficiently to bring that portion of the pole to be punctured in alinement with the pole-puncturing head and the carriage, the operator will arrest the forward movement of the pole by disengaging the conveyors from their source of power. The pole-lifting carriage will then be elevated by means of the hydraulically operated ram 27 provided in the pit 30 beneath the carriage. As the carriage begins to ascend, the wheels 35 will engage the periphery of the log and carry it upwardly therewith, as shown in Figures 2 and 15, the top or small end of the pole simultaneously being elevated by means of the similarly operated smaller hoist 55, preferably operably in conjunction with the carriage hoist. Two or more such hoists may be provided in connection with each conveyor to provide means for handling poles of different lengths, as indicated in Figure 15. Continued upward movement of the carriage and pole will cause the pole to engage the toothed periphery of the drive wheels 71 of the pole-puncturing head, thereby causing the puncturing head to be carried upwardly therewith. As soon as the carriage, pole and puncturing head have reached the position shown in Figure 2, or as soon as the stop chains 66 are sufficiently slack to permit the pole-puncturing head freedom of movement during the pole puncturing operation, the upward movement of the carriage will be arrested, preparatory to starting the pole puncturing operation. When the carriage is positioned as above, the pole-end guide table will have assumed a position out of engagement with the pole, as shown in Figures 2 and 5.

The operator will then connect the drive wheels 71 to their source of power, causing them to be rotated in the direction indicated by the arrow in Figure 5. Such rotation of the drive wheels will cause the pole to be rotated upon the wheels 35, by means of the toothed or spiked periphery of the drive wheels 71 engaging the periphery of the pole. The hand lever 151 is thrown from its inoperative to its operative position, causing the latch members 142 to become disengaged from the stop plates 138, provided at the terminal ends of the knife supporting arms, as shown in Figure 5.

As soon as each arm has thus been released from its corresponding latch member 142 it will be forced downwardly by means of one of the compression springs 95 until the cam roller 101, mounted in the arm, engages its corresponding operating cam 103. As the cam rotates, the arm carrying the puncturing knives will be raised against the compression of the spring 95 until it reaches the highest point of the cam. As the cam continues to rotate, the roller will leave the high point of the cam and the arm will be forced downwardly by the action of its corresponding spring 95 until the puncturing knives 122 engage the periphery of the rolling log. The above described action of the knife supporting arms is in effect similar to a hammer blow, thereby causing the puncturing knives to be driven into the surface of the pole or log with sufficient force to properly puncture or pierce the surface thereof to receive the preservative fluid. After the knives have thus been driven into the surface of the pole, the knife holder 109 in which the knives are mounted will adapt itself to the rolling action of the pole, by means of its pivotal connection with the knife supporting arm and the spring 117, as shown by dotted lines in Figure 10.

As shown in the above figure, the cams are preferably arranged in such a manner as to cause the knife supporting arms to operate progressively. As soon as the pole has made one complete revolution after the pole puncturing mechanism has been started, the knife supporting arms will be thrown out of engagement with the cams 103 and the rotation of the pole stopped. The carriage is then lowered to its normal position upon the stop bars 34, and the puncturing head will assume the position shown in Figure 1. The pole may then be conveyed from the machine by means of the conveyors, and another pole presented to the machine for like treatment.

One of the outstanding features of this novel pole-puncturing machine resides in the substantially universally mounted pole puncturing head, by the employment of which practically all sizes of poles or logs may be punctured regardless of whether straight or irregular in form both longitudinally and diametrically. As shown in Figures 2 and 15, particularly 15, during the rolling or rotation of the pole the puncturing head will adapt itself to any irregularities of the pole, both as to curvature and diameter, the carriage being free for oscillatory movement upon the pivot pins 24 and the pole puncturing head being vertically guided by means of the upright frame 67. The puncturing knives are also capable of uniformly and evenly puncturing or piercing the periphery of a pole of irregular cross-section, such as the one shown in Figure 5, thereby providing a machine adaptable for use to puncture the periphery of poles of practically all sizes in preparing such poles for a subsequent bath in a suitable fluid preservative, such as oil or creosote.

I claim as my invention:

1. In a pole puncturing machine, means for supporting the pole, said means being mounted to be raised bodily and tiltable to adapt itself to irregular or crooked poles, and pole puncturing means entering the pole on lines normal to its surface, supported to be correspondingly tiltable to maintain said lines normal.

2. A pole puncturing machine comprising puncturing means and carrier means, spaced supports to receive the pole, said carrier means mounted to be raised bodily and tilt on an axis in a plane between said supports, permitting them to tilt while maintaining the puncturing means normal to a crooked or irregular pole.

3. In a pole puncturing machine, a carriage having wheels to receive and support the end of the pole to be punctured, the wheels being supported on axles parallel with a supported pole whereby the wheels will rotate with the pole, said carriage being pivotally supported and adapted to tilt under pressure of the pole thereon.

4. In a pole puncturing machine, an upright ram having a crosshead, a carriage pivotally supported on said cross head and having pole supporting means upon opposite sides of said ram tiltable to accord to a crooked or irregular pole.

5. In a pole puncturing machine, a horizontal cross-head having means for raising and lowering it, upright standards on said cross-head, a carriage having horizontal pivots on said standards and free to oscillate thereon, and pole supporting means mounted on said carriage.

6. In a pole puncturing machine, pole puncturing and carrier means, the latter having tiltable spaced supports to receive the pole, means for raising said carrier means, means for feeding the pole over said carrier means, means for maintaining the puncturing means normal to the surface of the pole, and means between said supports for guiding the end of the pole thereover.

7. In a pole puncturing machine, spaced supports to receive the pole, means for feeding the pole to said supports and a table having a surface for contact with the end of the pole and positioned to guide the pole from one support to the other, said table including slats having downwardly turned ends.

8. In a pole puncturing machine, pole carrier means having spaced pole supports adapted to rotate in planes at right angles substantially to the direction of movement of the pole, and a table between the supports to guide the end of the pole from one support to the other.

9. In a pole puncturing machine, a carrier means having spaced pole supports rotatable at an angle to the direction of movement of the pole, a table for directing the end of the pole from one support to the other, said table having a guiding surface.

10. In a pole puncturing machine, a carriage having means for supporting the pole to be punctured during the puncturing operation, means for delivering the pole endwise to said carriage, and a table arranged to guide the end of the pole over said supporting means, said table having a central slat with upwardly turned ends, and a series of slats on each side of said central slat provided with downwardly turned ends.

11. In a pole puncturing machine, a pole-supporting carriage mounted to tilt to adapt it for crooked or irregular poles, said carriage being mounted for vertical movement, means for delivering the poles endwise thereto, and means for leveling the carriage when moved to its depressed or lowered position.

12. In a pole puncturing machine, a pole-supporting carriage mounted to tilt to adapt it for crooked or irregular poles, said carriage being mounted for vertical movement, means for delivering the poles endwise thereto, guide members, and a pin mounted in said carriage in position to engage said guide members and level said carriage when it is moved to its depressed or lowered position.

13. In a pole puncturing machine, a carriage having means for supporting the pole to be punctured during the puncturing operation, said carriage being mounted to tilt under pressure of the pole to conform its supporting means to crooked or concave poles, and mechanism for feeding the pole endwise and pole puncturing means tiltable to maintain the puncturing means normal to the pole surface in the tilted or untilted positions of the pole supports.

14. In a pole puncturing machine, a vertically movable ram having a cross-head thereon and standards on said cross-head, a frame pivotally suspended on said standards and having a surface adapted to receive the pole to be punctured, said frame tilting on its pivots to adapt itself to uneven or crooked poles.

15. In a pole puncturing machine, a frame and means for raising and lowering it, said frame having a pole supporting table mounted therein for contact with the end of the pole to be punctured, said table tilting under pressure of the pole thereon to adapt itself to uneven or crooked poles and a vertically movable puncturing tool also tiltable to maintain the puncturing point of the tool normal to the tool surface.

16. In a pole puncturing machine, a frame and means pivotally supporting it for vertical movement, said frame having a surface adapted to receive the end of the pole to be punctured and tilting on its pivots to accommodate itself to uneven or crooked poles, upright guides on said frame and a puncturing tool support vertically movable on said guides.

17. In a pole puncturing machine, a tiltable frame, an upright guide thereon, said frame having a surface to receive the pole to be punctured, a counter-balanced support mounted on said guide for a vertical and tilting movement thereon, hammers mounted in said support and puncturing blades carried by said hammers.

18. In a pole puncturing machine, means for supporting the end of the pole to be punctured, means for rotating the pole during the puncturing operation, a plurality of hammers and knives mounted therein to enter the surface of the pole, each knife comprising a series of blades arranged to make a corresponding number of punctures diagonally of the pole and partially across the grain to expose comparatively large transverse areas of the grain of the wood.

19. In a pole puncturing machine, a carriage having means for supporting the end of the pole to be punctured, means for raising and lowering said carriage, a carrier suspended for vertical movement above said carriage, means for balancing said carrier and normally holding it in its raised position, means in the path of the pole when said carriage is raised for rotating the pole on said carriage, a driving mechanism for said rotating means, the upward movement of said carriage and pole raising said carrier to engage said pole rotating means more firmly with the pole, and means for forcing a wood fiber severing means into the surface of the pole during its rotation.

20. In a pole puncturing machine, a carriage adapted to support the pole to be punctured, a carrier mounted above said carriage, a series of knives mounted in said carrier for puncturing the surface of the pole, wheels mounted in said carrier and having a series of teeth for engaging the surface of the pole to rotate it on said carriage progressively with the movement of said knives, means for revolving said wheels, and said teeth being adjustable in the peripheries of said wheels to adapt them for poles of different degrees of hardness.

21. In a pole puncturing machine, a support for the pole to be punctured, means for rotating the pole and puncturing blades having bias cutting edges adapted to enter the pole and sever the fibers of the wood and expose the severed ends of the fibers to the action of the preserving fluid.

22. In a pole puncturing machine, means for supporting the pole to be punctured, and a puncturing device comprising blades having cutting edges adapted to enter the pole and make a cut bias to the wood fibers to expose several ends of the fibres to the preserving fluid.

23. In a pole puncturing machine, means for feeding and rotating a pole, a hammer and puncturing blades mounted in said hammer to enter the pole diagonally of its grain to sever the fibers and expose the ends thereof to the preserving fluid.

24. In a pole puncturing machine, means for supporting the end of the pole to be punctured, means for rotating the pole on said supporting means transversely to its feed, and means for guiding the end of the pole over said supporting means and preventing it from lodging thereon and means moving relatively with said rotating and supporting means for puncturing the pole during its rotation.

25. In a pole puncturing machine, means for supporting the pole and adapted to tilt to conform to crooked or uneven poles, and a puncturing tool support connected with said pole supporting means and adapted to tilt relatively thereto to maintain the puncturing points of the tool normal to the surface of the tool.

26. In a pole puncturing machine, means for supporting the pole and adapted to tilt to conform to a crooked or uneven pole and a puncturing tool support having a vertical movement with respect to said pole supporting means and connected therewith for a proportionately tilting movement.

27. In a pole puncturing machine, means for supporting the pole and adapted to tilt to conform to crooked or uneven poles, a puncturing tool support movable in guides on said pole supporting means and adapted to tilt proportionately therewith.

In witness whereof, I have hereunto set my hand this 29th day of May 1923.

ROBERT D. VALENTINE.